(12) United States Patent
Ben-Moshe et al.

(10) Patent No.: US 10,101,934 B1
(45) Date of Patent: Oct. 16, 2018

(54) MEMORY ALLOCATION BALANCING FOR STORAGE SYSTEMS

(71) Applicant: EMC Corporation, Hopkinton, MA (US)

(72) Inventors: Tal Ben-Moshe, Kiryat Ono (IL); Eli Dorfman, Raanana (IL); Kirill Shoikhet, Raanana (IL); David Krakov, Ramat Gan (IL); Roman Vainbrand, Kfar Saba (IL); Noa Cohen, Tel Avivi (IL)

(73) Assignee: EMC Corporation, Hopkinton, MA (US)

( * ) Notice: Subject to any disclaimer, the term of this patent is extended or adjusted under 35 U.S.C. 154(b) by 90 days.

(21) Appl. No.: 15/079,213

(22) Filed: Mar. 24, 2016

(51) Int. Cl.
  *G06F 12/00* (2006.01)
  *G06F 3/06* (2006.01)
  *G06F 12/06* (2006.01)

(52) U.S. Cl.
  CPC .......... *G06F 3/0631* (2013.01); *G06F 3/0604* (2013.01); *G06F 3/0673* (2013.01); *G06F 12/0646* (2013.01); *G06F 2212/1008* (2013.01); *G06F 2212/657* (2013.01)

(58) Field of Classification Search
  CPC .. G06F 3/0631; G06F 3/0604; G06F 12/0646; G06F 2212/1008; G06F 2212/657
  See application file for complete search history.

(56) References Cited

U.S. PATENT DOCUMENTS

| | | | |
|---|---|---|---|
| 5,204,958 A | 4/1993 | Cheng et al. | |
| 5,453,998 A | 9/1995 | Dang | |
| 5,603,001 A | 2/1997 | Sukegawa et al. | |
| 6,085,198 A | 7/2000 | Skinner et al. | |
| 6,125,399 A | 9/2000 | Hamilton | |
| 6,671,694 B2 | 12/2003 | Baskins et al. | |
| 7,073,115 B2 | 7/2006 | English et al. | |
| 7,203,796 B1 | 4/2007 | Muppalaneni et al. | |
| 7,472,249 B2 | 12/2008 | Cholleti et al. | |
| 7,908,484 B2 | 3/2011 | Haukka et al. | |
| 8,386,425 B1 | 2/2013 | Kadayam et al. | |
| 8,386,433 B1 | 2/2013 | Kadayam | |
| 8,799,705 B2 | 8/2014 | Hallak et al. | |
| 9,026,729 B1 | 5/2015 | Hallak et al. | |
| 9,063,910 B1 | 6/2015 | Hallak et al. | |
| 9,104,326 B2 | 8/2015 | Frank et al. | |

(Continued)

FOREIGN PATENT DOCUMENTS

JP 2014-206884 10/2014

OTHER PUBLICATIONS

Notice of Allowance dated Apr. 26, 2016 corresponding to U.S. Appl. No. 14/228,982; 9 Pages.

(Continued)

*Primary Examiner* — Reginald Bragdon
*Assistant Examiner* — Mehdi Namazi
(74) *Attorney, Agent, or Firm* — Daly, Crowley, Mofford & Durkee, LLP

(57) ABSTRACT

Described herein are embodiments of a process that can be used to balance the allocation of primary memory between different types of information. In some embodiments, the memory allocation is balanced dynamically based on observed I/O patterns. Related system embodiments are also described.

17 Claims, 4 Drawing Sheets

(56) References Cited

U.S. PATENT DOCUMENTS

| | | | |
|---|---|---|---|
| 9,703,789 | B2 | 7/2017 | Bowman et al. |
| 2003/0061227 | A1 | 3/2003 | Baskins et al. |
| 2004/0267835 | A1 | 12/2004 | Zwilling et al. |
| 2006/0271540 | A1 | 11/2006 | Williams |
| 2007/0089045 | A1 | 4/2007 | Corbett et al. |
| 2007/0240125 | A1 | 10/2007 | Degenhardt et al. |
| 2008/0082969 | A1 | 4/2008 | Agha et al. |
| 2008/0235793 | A1 | 9/2008 | Schunter et al. |
| 2009/0216953 | A1 | 8/2009 | Rossi |
| 2010/0005233 | A1* | 1/2010 | Hosokawa ............. G06F 12/02 711/105 |
| 2010/0250611 | A1 | 9/2010 | Krishnamurthy |
| 2011/0087854 | A1 | 4/2011 | Rushworth et al. |
| 2011/0137916 | A1 | 6/2011 | Deen et al. |
| 2011/0302587 | A1 | 12/2011 | Nishikawa et al. |
| 2012/0023384 | A1 | 1/2012 | Naradasi et al. |
| 2012/0124282 | A1 | 5/2012 | Frank et al. |
| 2012/0158736 | A1 | 6/2012 | Milby |
| 2012/0204077 | A1 | 8/2012 | D'Abreu et al. |
| 2012/0233432 | A1* | 9/2012 | Feldman ................ G11B 5/012 711/170 |
| 2013/0036289 | A1 | 2/2013 | Welnicki et al. |
| 2013/0212074 | A1 | 8/2013 | Romanski et al. |
| 2013/0290285 | A1 | 10/2013 | Gopal et al. |
| 2013/0318053 | A1 | 11/2013 | Provenzano et al. |
| 2013/0326318 | A1 | 12/2013 | Haswell |
| 2013/0346716 | A1 | 12/2013 | Resch |
| 2014/0019764 | A1 | 1/2014 | Gopal et al. |
| 2014/0032992 | A1 | 1/2014 | Hara et al. |
| 2014/0122823 | A1 | 5/2014 | Gupta et al. |
| 2014/0188805 | A1 | 7/2014 | Vijayan |
| 2014/0244598 | A1 | 8/2014 | Haustein et al. |
| 2015/0019507 | A1 | 1/2015 | Aronovich |
| 2015/0098563 | A1 | 4/2015 | Gulley et al. |
| 2015/0149789 | A1* | 5/2015 | Seo ...................... G06F 3/0608 713/193 |
| 2015/0186215 | A1 | 7/2015 | Das Sharma et al. |
| 2015/0199244 | A1 | 7/2015 | Venkatachalam et al. |
| 2015/0205663 | A1 | 7/2015 | Sundaram et al. |
| 2016/0011941 | A1 | 1/2016 | He et al. |
| 2016/0110252 | A1 | 4/2016 | Hyun et al. |
| 2016/0132270 | A1 | 5/2016 | Miki |
| 2017/0123995 | A1 | 5/2017 | Freyensee et al. |
| 2017/0255515 | A1 | 9/2017 | Kim et al. |

OTHER PUBLICATIONS

Request for Continued Examination (RCE) and Response to Final Office Action dated Feb. 25, 2016 corresponding to U.S. Appl. No. 14/228,971; Response filed on May 25, 2016; 12 Pages.
U.S. Office Action dated Jun. 10, 2016 corresponding to U.S. Appl. No. 14/228,971; 27 Pages.
Response to Office Action dated Jan. 12, 2016 corresponding to U.S. Appl. No. 14/229,491; Response filed on Jun. 2, 2016; 7 Pages.
Notice of Allowance dated Jul. 25, 2016 corresponding to U.S. Appl. No. 14/229,491; 10 Pages.
Office Action dated Jul. 15, 2016 corresponding to U.S. Appl. No. 14/751,652; 11 Pages.
U.S. Non-Final Office Action dated Apr. 21, 2017 for U.S. Appl. No. 15/079,215; 53 Pages.
EMC Corporation, "Introduction to the EMC XtremIO Storage Array;" Version 4.0; White Paper—A Detailed Review; Apr. 2015; 65 Pages.
Vijay Swami, "XtremIO Hardware/Software Overview & Architecture Deepdive;" EMC On-Line Blog; Nov. 13, 2013; Retrieved from <http://vjswami.com/2013/11/13/xtremio-hardwaresoftware-overview-architecture-deepdive/>; 18 Pages.
U.S. Appl. No. 14/228,971, filed Mar. 28, 2014, Shoikhet et al.
U.S. Appl. No. 14/228,360, filed Mar. 28, 2014, Lempel et al.
U.S. Appl. No. 14/228,982, filed Mar. 28, 2014, Ben-Moshe et al.
U.S. Appl. No. 14/229,491, filed Mar. 28, 2014, Luz et al.
U.S. Appl. No. 14/496,359, filed Sep. 25, 2014, Love et al.
U.S. Appl. No. 14/751,652, filed Jun. 26, 2015, Natanzon et al.
U.S. Appl. No. 14/979,890, filed Dec. 28, 2015, Meiri et al.
U.S. Appl. No. 15/085,168, filed Mar. 30, 2016, Meiri et al.
U.S. Appl. No. 15/081,137, filed Mar. 25, 2016, Natanzon et al.
U.S. Appl. No. 15/079,205, filed Mar. 24, 2016, Dorfman et al.
U.S. Appl. No. 15/079,208, filed Mar. 24, 2016, Ben-Moshe et al.
U.S. Appl. No. 15/079,215, filed Mar. 24, 2016, Krakov et al.
U.S. Office Action dated Aug. 27, 2015 corresponding to U.S. Appl. No. 14/228,971; 23 Pages.
Response to U.S. Office Action dated Aug. 27, 2015 corresponding to U.S. Appl. No. 14/228,971; Response filed on Jan. 14, 2016; 10 Pages.
U.S. Final Office Action dated Feb. 25, 2016 corresponding to U.S. Appl. No. 14/228,971; 27 Pages.
U.S. Office Action dated Sep. 22, 2015 corresponding to U.S. Appl. No. 14/228,982; 17 Pages.
Response to U.S. Office Action dated Sep. 22, 2015 corresponding to U.S. Appl. No. 14/228,982; Response filed on Feb. 1, 2016; 10 Pages.
U.S. Office Action dated Jan. 12, 2016 corresponding to U.S. Appl. No. 14/229,491; 12 Pages.
U.S. Office Action dated Dec. 4, 2014 corresponding to U.S. Appl. No. 14/496,262; 16 Pages.
Response to U.S. Office Action dated Dec. 4, 2014 corresponding to U.S. Appl. No. 14/496,262; Response filed on Dec. 11, 2014; 12 Pages.
U.S. Notice of Allowance dated Jan. 9, 2015 corresponding to U.S. Appl. No. 14/496,262; 8 Pages.
312 Amendment filed Feb. 5, 2015 corresponding to U.S. Appl. No. 14/496,262; 9 Pages.
U.S. Notice of Allowance dated Mar. 16, 2015 corresponding to U.S. Appl. No. 14/620,631; 10 Pages.
U.S. Appl. No. 15/282,546, filed Sep. 30, 2016, Kucherov et al.
U.S. Appl. No. 15/281,593,. filed Sep. 30, 2016, Braunschvig et al.
U.S. Appl. No. 15/281,597, filed Sep. 30, 2016, Bigman.
Request for Continued Examination (RCE) and Response to U.S. Final Office Action dated Oct. 4, 2016 corresponding to U.S. Appl. No. 14/228,971; RCE and Response filed on Jan. 4, 217; 19 Pages.
U.S. Non-Final Office Action dated Feb. 9, 2017 for 14/228,971; 38 Pages.
Response to U.S. Non-Final Office Action dated Feb. 9, 2017 for U.S. Appl. No. 14/228,971; Response filed on May 9, 2017; 12 Pages.
U.S. Final Office Action dated Jun. 20, 2017 for U.S. Appl. No. 14/228,971; 40 Pages.
Response to Office Action dated Jun. 2, 2017 from U.S. Appl. No. 15/079,208, filed Sep. 5, 2017; 10 Pages.
Response to U.S. Non-Final Office Action dated Apr. 21, 2017 for U.S. Appl. No. 15/079,215; Response filed on Jul. 21, 2017; 9 Pages.
Notice of Allowance dated Sep. 22, 2017 for U.S. Appl. No. 15/079,215; 9 Pages.
Response (w/RCE) to U.S. Final Office Action dated Jun. 20, 2017 for U.S. Appl. No. 14/228,971; Response filed Sep. 13, 2017; 14 Pages.
Response to U.S. Office Action dated Jun. 10, 2016 corresponding to U.S. Appl. No. 14/228,971; Response filed Aug. 17, 2016; 10 Pages.
U.S. Final Office Action dated Oct. 4, 2016 corresponding to U.S. Appl. No. 14/228,971; 37 Pages.
U.S. Non-Final Office Action dated Jun. 2, 2017 for U.S. Appl. No. 15/079,208; 19 Pages.
U.S. Non-Final Office Action dated Oct. 4, 2017 for U.S. Appl. No. 14/228,971; 37 pages.
U.S. Non-Final Office Action dated Nov. 28, 2017 corresponding to U.S. Appl. No. 15/079,205; 9 Pages.
U.S. Non-Final Office Action dated Dec. 29, 2017 corresponding to U.S. Appl. No. 15/079,208; 10 Pages.
U.S. Non-Final Office Action dated Dec. 22, 2017 corresponding to U.S. Appl. No. 15/282,546; 12 Pages.

(56) References Cited

OTHER PUBLICATIONS

Response to U.S. Non-Final Office Action dated Dec. 1, 2017 for U.S. Appl. No. 14/979,890; Response filed on Feb. 28, 2018; 9 Pages.
Response to U.S. Non-Final Office Action dated Nov. 28, 2017 for U.S. Appl. No. 15/079,205; Response filed on Feb. 28, 2018; 11 Pages.
Response to U.S. Non-Final Office Action dated Oct. 4, 2017 corresponding to U.S. Appl. No. 14/228,971; Response filed Jan. 26, 2018; 11 Pages.
Response to U.S. Non-Final Office Action dated Dec. 29, 2017 for U.S. Appl. No. 15/079,208; Response filed on Apr. 30, 2018; 7 Pages.
Response to U.S. Non-Final Office Action dated Dec. 22, 2017 for U.S. Appl. No. 15/282,546; Response filed May 17, 2018; 8 Pages.
U.S. Final Office Action dated May 29, 2018 for U.S. Appl. No. 14/228,971; 35 pages.
U.S. Non-Final Office Action dated May 31, 2018 for U.S. Appl. No. 15/281,593; 10 pages.
U.S. Non-Final Office Action dated Dec. 1, 2017 for U.S. Appl. No. 14/979,890; 10 Pages.

* cited by examiner

US 10,101,934 B1

MEMORY ALLOCATION BALANCING FOR STORAGE SYSTEMS

BACKGROUND

Storage systems may utilize an array of storage devices to provide high performance scale-out storage. A storage system may use various metadata to process I/O operations. Such metadata may be cached in primary memory (e.g., volatile RAM) to avoid accessing relatively slower non-volatile storage devices (e.g., solid-state drives or SSDs). Primary memory may also be used for other purposes, such as maintaining a journal of pending writes. System performance may be limited by primary memory capacity and/or by how primary memory capacity is allocated.

SUMMARY

Described herein are embodiments of a process that can be used to balance the allocation of primary memory for different purposes. In some embodiments, primary memory allocation is balanced dynamically based on observed client I/O patterns. Related system embodiments are also described.

According to an aspect of the disclosure, a method comprises: calculating a relationship of a first number of read operations and a second number of write operations of a plurality of I/O operations made to a storage system having a volatile memory; selecting a memory allocation scheme based upon the relationship between the first number of read operations and the second number of write operations; and applying the memory allocation scheme, wherein applying the memory allocation scheme comprises allocating capacity of the volatile memory based upon selected allocation scheme. In some embodiments, calculating the relationship of a first number of read operations and the second number of write operations comprises calculating a moving average of the relationship of the first number of read operations and the second number of write operations. In certain embodiments, selecting a memory allocation scheme is further based upon moving averages of read I/O latency and write I/O latency.

In one embodiment, the method further comprises, according to the selected memory allocation scheme, allocating a first amount of volatile memory as a metadata cache and allocating a second amount of volatile memory as a journal. In some embodiments, mapping logical block addresses (LBA) of the storage system to chunk hashes and mapping the chunk hashes to physical storage locations on storage devices of the storage system.

s In certain embodiments, the method further comprises de-allocating capacity of the volatile memory based upon the selected allocation scheme. In some embodiments, applying the memory allocation scheme further comprises determining if the memory allocation scheme should be applied. In one embodiment, the method further comprises using hysteresis to determine if the memory allocation scheme should be applied. In particular embodiments, calculating the relationship of the first number of read operations and the second number of write operations comprises calculating a ratio of the first number of read operations and the second number of write operations, the method further comprising selecting a first memory allocation scheme if the ratio exceeds a first threshold; selecting a second memory allocation scheme if ratio exceeds a second threshold; and selecting a third memory allocation scheme if the ratio exceeds neither the first threshold nor the second threshold.

According to another aspect of the disclosure, a system comprises a processor, a volatile memory, and a non-volatile memory. The non-volatile memory may store computer program code that when executed on the processor causes the processor to execute a process operable to perform one or more embodiments of the method described hereinabove.

According to yet another aspect of the disclosure, a computer program product may be tangibly embodied in a non-transitory computer-readable medium, the computer-readable medium storing program instructions that are executable to perform one or more embodiments of the methods described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the term "storage system" may be broadly construed so as to encompass, for example, private or public cloud computing systems for storing data as well as systems for storing data comprising virtual infrastructure and those not comprising virtual infrastructure. As used herein, the terms "client" and "user" may refer to any person, system, or other entity that uses a storage system to read/write data.

As used herein, the term "storage device" may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage array" may be used herein to refer to any collection of storage devices.

As used herein, the term "random access storage device" may refer to any non-volatile random access memory (i.e., non-volatile memory wherein data can be read or written in generally the same amount of time irrespective of the physical location of data inside the memory). Non-limiting examples of random access storage devices may include NAND-based flash memory, single level cell (SLC) flash, multilevel cell (MLC) flash, and next generation non-volatile memory (NVM). For simplicity of explanation, the term "disk" may be used synonymously with "storage device" herein.

While vendor-specific terminology may be used herein to facilitate understanding, it is understood that the concepts, techniques, and structures sought to be protected herein are not limited to use with any specific commercial products.

Figure 1:
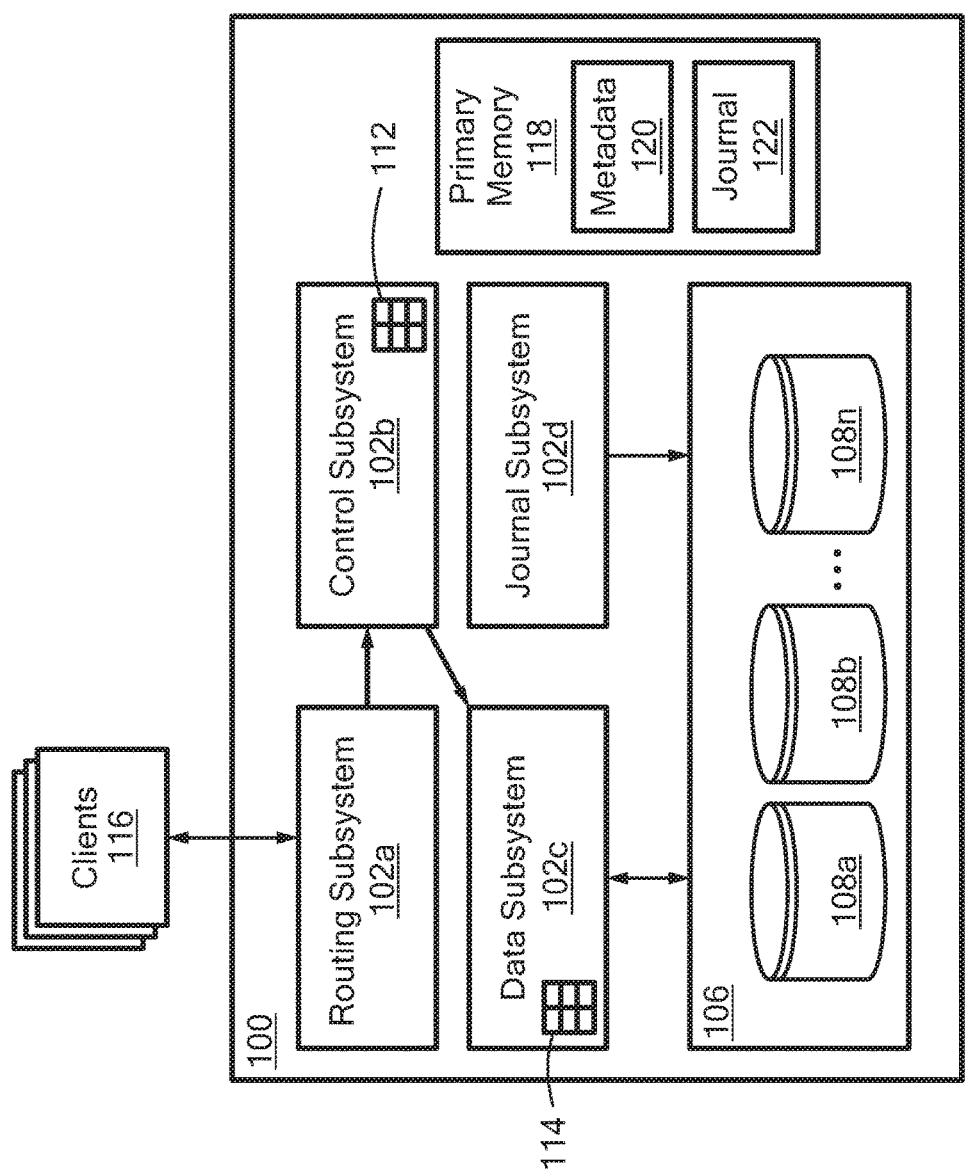
FIG. 1 is a block diagram of a storage system in accordance with an embodiment of the disclosure.

FIG. 1 shows a storage system 100 according to an illustrative embodiment of the disclosure. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random access storage devices, such as SSDs.

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a journal subsystem 102d. In one embodiment, the subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, a subsystem 102 may be provided, at least in part, as hardware such as digital signal processor (DSP) or an application specific integrated circuit (ASIC) configured to perform functionality described herein.

The routing subsystem 102a may be configured to receive I/O operations from clients 116 using an external application programming interface (API) and to translate the I/O operations into internal commands. In some embodiments, the routing subsystem 102a is configured to receive Small Computer System Interface (SCSI) commands from clients. In certain embodiments, the system 100 may store data in fixed-size chunks, for example 4K chunks, where each chunk may have a unique hash value (referred to herein as a "chunk hash"). In such embodiments, the routing subsystem 102a may be configured to split client data (or "user data") into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1, this mapping may be maintained using a data structure 112, referred to herein as an "I/O address to chunk hash mapping table" or "A2H table," according to some embodiments. In a one embodiment, I/O addresses may be logical addresses used by clients to access data within the storage system 100. In some embodiments, I/O addresses correspond to logical block addresses (LBAs).

The data subsystem 102c may be configured to maintain a mapping between chunk hashes and physical storage addresses (i.e., storage locations within the storage array 106 and/or within individual storage devices 108). As shown in FIG. 1, this mapping may be maintained as a data structure 114, referred to herein as a "hash to physical address mapping table" or "H2P table," according to some embodiments. The data subsystem 102c may also be configured to read and write data from/to the storage array 106 (and/or to individual storage devices 108 therein). In some embodiments, the data subsystem 102c may access the storage array 106 via a driver or other type of interconnect.

It will be appreciated that combinations of the A2H table 112 and the H2P table 114 can provide multiple levels of indirection between the logical (or "I/O") address a client 116 uses to access data and the physical address where that data is stored. Among other advantages, this may give the storage system 100 freedom to relocate data within the storage array 106 without affecting a client's 116 access to that data.

In addition to storing data, the storage array 106 may store various types of metadata used by the system 100. Such metadata may include information within the A2H table 112 and information within the H2P table 114. In some embodiments, the system also maintains reference counts for chunk hashes as metadata. Metadata may be used by the various subsystems 102 during the course of processing I/O operations. Moreover, some I/O operations may result in changes to metadata, as discussed further below.

To increase efficiency, metadata 120 may be cached within primary memory 118. This can allow the various subsystems 102 to efficiently process I/O operations without having to fetch metadata from the storage array 106. The size of the metadata cache 120 may be limited by available memory resources. In various embodiments, the metadata cache 120 may be too small to store all system metadata. If processing of a particular I/O operation requires access to uncached metadata, it may be necessary for a subsystem 102 to fetch the uncached metadata from the storage array 106. Depending on the cache policy, the fetched metadata may be added to the metadata cache 120, while other metadata may be demoted (or "evicted") from metadata cache 120 as needed.

In some embodiments, the system 100 provides a mechanism whereby subsystems 102 can make changes to metadata without directly writing those changes to the storage array 106. In particular, subsystems 102a-102c can change metadata directly within the cache 120 in primary memory 118 and then notify the journal subsystem 102d of the metadata changes. The journal subsystem 102d may be responsible for ensuring that the metadata changes are written to the storage array 106 (or "hardened").

The journal subsystem 102d may be configured to maintain a journal 122 of pending metadata changes (i.e., metadata changes that have not yet been written to the storage array 106). The journal 122 may be stored in primary memory 118, as shown. At some future time, the journal subsystem 102d may commit the metadata changes from the journal 122 to non-volatile storage 106 using a process referred to as "de-staging." By maintaining a journal 122 of metadata changes, the journal subsystem 102d can amortize writes to the storage array 106. In some embodiments, the journal subsystem 102d may run the de-staging process on a periodic basis.

The size of the journal 122 may be limited based on the amount of primary memory 118 allocated thereto. Thus, at any given time, the journal 122 has a fixed size meaning that it can store a limited number of pending metadata changes. When the journal 122 becomes full, the journal subsystem 102d may be forced to commence the de-staging process to free space within the journal 122, thereby forcing de-staging to run prematurely (i.e., before it is otherwise scheduled to run).

It is appreciated that system performance may be limited by primary memory 118 and, in particular, the amount of primary memory 118 allocated for the metadata cache 120 and/or for the journal 122. If insufficient memory 118 is allocated for the metadata cache 120, I/O operation processing may require fetching metadata from the storage array 106. On the other hand, if insufficient memory 118 is allocated for the journal 122, the system 100 may be forced to run the de-staging process frequently, increasing the number of writes to the storage array 106.

In some embodiments, the system 100 includes features used in EMC® XTREMIO®.

Figures 2A, 2B:
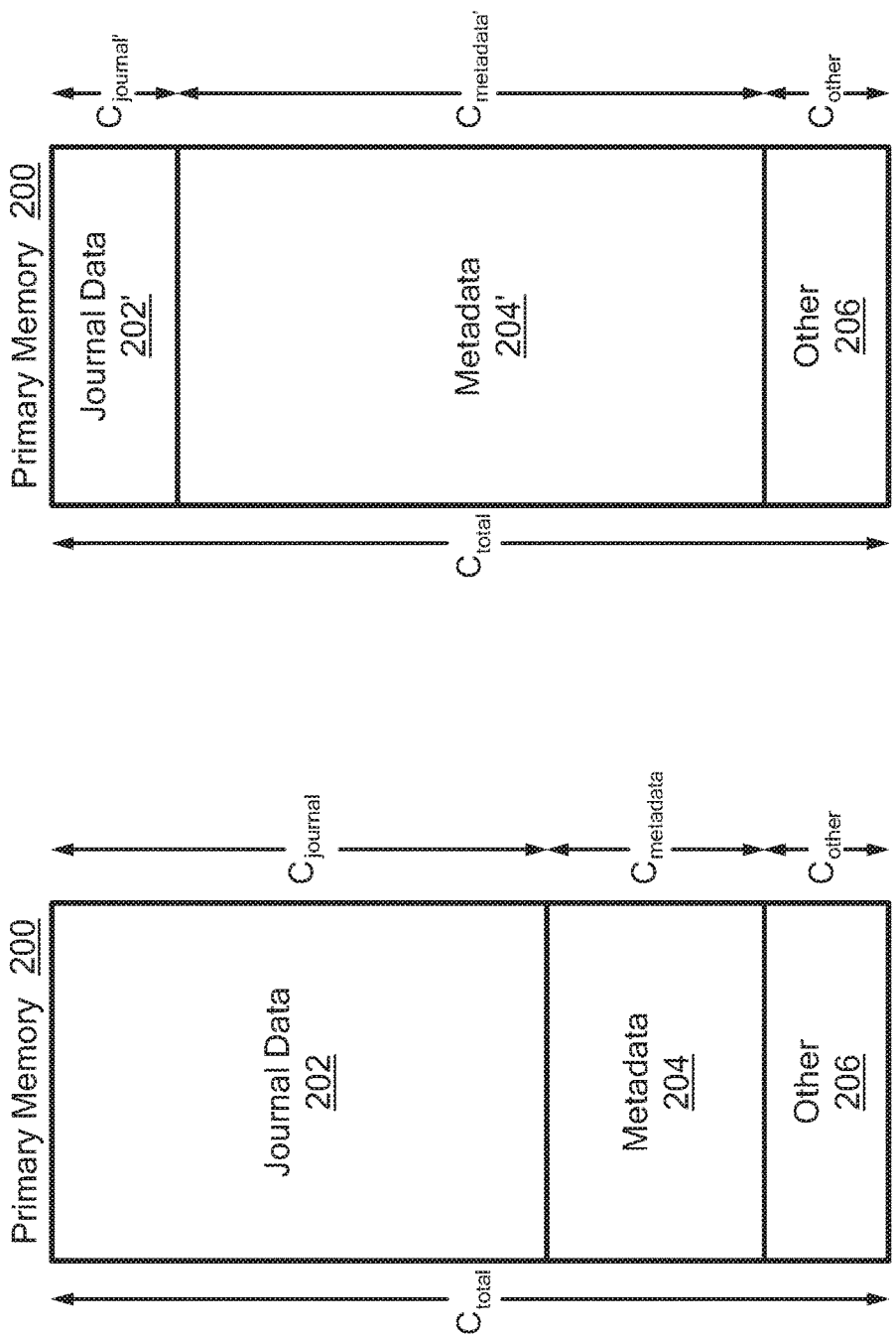
FIGS. 2A and 2B are diagrams illustrating primary memory allocation in accordance with embodiments of the disclosure.

Referring to FIGS. 2A and 2B, a storage system (e.g., system 100 of FIG. 1) may utilize a dynamic balancing technique to allocate primary memory 118 between space allocated for the journal 122 and space allocated for the metadata cache 120, in accordance with embodiments of the disclosure.

In some embodiments, read operation processing may benefit by increasing the size of the metadata cache 120 and decreasing the size of the journal 122 because read operations do not generally cause metadata changes that would benefit from increased journal 122 size. On the other hand, write operation processing may benefit from a larger journal 122 because, particularly using content-based addressing, a write operation may require updating the A2H table 112 and/or the H2P table 114 (FIG. 1) which could be written to the journal 122 for later de-staging. Thus, if a relatively high percentage of I/O operations are read operations, system performance may be increased by allocating more memory to the metadata cache 120. Conversely, if write operations are dominant, system performance may be increased by allocating more memory for the journal 122.

FIG. 2A is an example of a memory allocation scheme that could be used in a "high write" scenario, according to embodiments of the disclosure. A primary memory 200, which may be the same as or similar to primary memory 118 in FIG. 1, may have a capacity $C_{total}$. A first portion $C_{journal}$ of primary memory 200 may be allocated for journaling journal data 202 and a second portion $C_{metadata}$ of primary memory 200 may be allocated for caching metadata 204. The remaining primary memory capacity $C_{other}$ may be allocated for other system uses 206. In the example shown, the capacity $C_{journal}$ allocated for journal data 202 may be larger than the capacity $C_{metadata}$ allocated for caching metadata 204. Thus, the illustrated scheme may be used to improve system performance in a "high write" scenario.

FIG. 2B is an example of a memory allocation scheme that could be used in a "high read" scenario, according to embodiments of the disclosure. Here, a first portion $C_{journal}'$ of primary memory 200 may be allocated for journaling journal data 202' and a second portion $C_{metadata}'$ of primary memory 200 may be allocated for caching metadata 204. The remaining primary memory capacity $C_{other}$ may be allocated for other system uses 206. In the example shown, the capacity $C_{metadata}'$ allocated for caching metadata 204' may be larger than the capacity $C_{journal}'$ allocated for journal data 202'. Thus, the illustrated scheme may be used to improve system performance in a "high read" scenario.

In various embodiments, a storage system 100 (FIG. 1) selects a memory allocation scheme dynamically based upon client behavior and I/O patterns. In particular embodiments, the system can monitor the pattern of I/O operations over time and select a memory allocation scheme based upon collected statistical information. In some embodiments, the storage system 100 uses an adaptive allocation scheme, for example, by increasing the metadata allocation 204 and decreasing the journal allocation 202 if the ratio of read operations to write operations increases over time.

Figure 3:
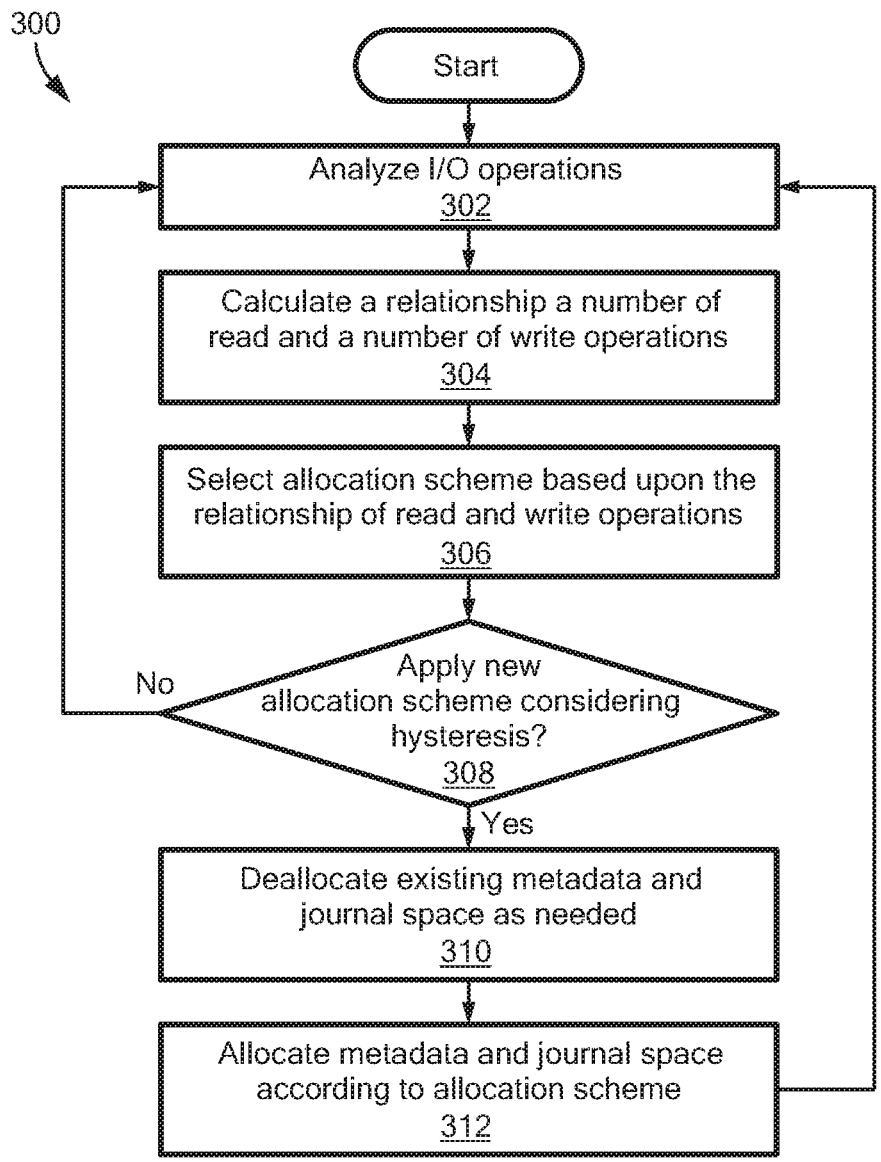
FIG. 3 is flow diagram illustrating processing that may occur within a storage system in accordance with some embodiments of the disclosure.

FIG. 3 is a flow diagram showing illustrative processing that can be implemented within a storage system, such as storage system 100 of FIG. 1. Rectangular elements (typified by element 302 in FIG. 3), herein denoted "processing blocks," represent computer software instructions or groups of instructions. Diamond shaped elements (typified by element 308 in FIG. 3), herein denoted "decision blocks," represent computer software instructions, or groups of instructions, which affect the execution of the computer software instructions represented by the processing blocks. Alternatively, the processing and decision blocks may represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 3, a process 300 may be used to dynamically allocate primary memory capacity, according to embodiments of the disclosure. At block 302, I/O operations may be analyzed. The I/O operations may be issued by clients 116 in FIG. 1, according to various embodiments. In some embodiments, this includes collecting statistics on the number of read operations and on the number of write operations.

At block 304, a relationship of a number of read operations and a number of write operations may be calculated (e.g., using information obtained at block 302). In various embodiments, block 304 includes calculating a ratio of the number of read operations and the number of write operations. In some embodiments, block 304 may include calculating a moving average of the relationship of the number of read and write operations. For example, the ratio of the number read operations and the number of write operations may be calculated every M minutes, and the last N calculations may be averaged.

At block 306, the relationship of the number of read operations and the number of write operations may be used to select a memory allocation scheme. In certain embodiments, a fixed number of memory allocation schemes are defined to accommodate expected I/O patterns. In some embodiments, the set of possible memory allocation schemes includes a "read only" memory allocation scheme, a "write only" memory allocation scheme, and a "read-write" memory allocation scheme. The "read only" scheme may be selected if the ratio of reads to writes exceeds a first threshold (e.g., 95:5), the "write only" scheme may be selected if the ratio of writes to reads exceeds a second threshold (e.g., 95:5), and the "read-write" scheme may be selected if neither condition is met. In some embodiments, a predefined "read only" scheme comprises allocating significantly more primary memory for metadata compared to journaling, whereas a predefined "write only" scheme comprises allocating significantly more primary memory to journaling compared to metadata.

In addition to using the read-write ratio to select a memory allocation scheme, a scheme may be selected or adjusted based upon I/O performance statistics, according to some embodiments. For example, in one embodiment, average read and write latency for the last M minutes (i.e., moving averages) may be calculated. If average write latency exceeds a predetermined threshold, a new memory allocation scheme may be selected (or the previously selected scheme may be adjusted) to provide more journal space. Conversely, if average read latency exceeds a predetermined threshold, the memory allocation scheme may be selected/adjust to provide more metadata space.

In some embodiments, at block 308, the process can include a hysteresis-like mechanism to filter fast changes and prevent the memory allocation scheme from changing rapidly. For example, if the memory allocation scheme changes when the read-write ratio exceeds a given threshold $T_1$, the scheme may change again only when the read-write ratio falls below a second threshold $T_2$, where $T_2 < T_1$.

At blocks 310 and 312, the selected memory allocation scheme may be applied by allocating unused primary memory capacity and/or by de-allocating existing allocated memory. In some embodiments, if primary memory was previously allocated for metadata and/or journaling, some or all of that previously allocated memory may be de-allocated (or "freed") to make space for the new allocation scheme (block 310). For example, if the amount of metadata space is to be increased, existing journal memory may be de-allocated by running the de-staging process and the freed memory may be allocated to metadata. As another example, if the amount of journal space is to be increased, existing metadata space may be freed by evicting entries from cache and allocating the freed space for journaling.

In some embodiments, the process 300 may be executed in a continuous fashion to provide adaptive memory allocation by continuously monitor client read/write patterns.

Figure 4:
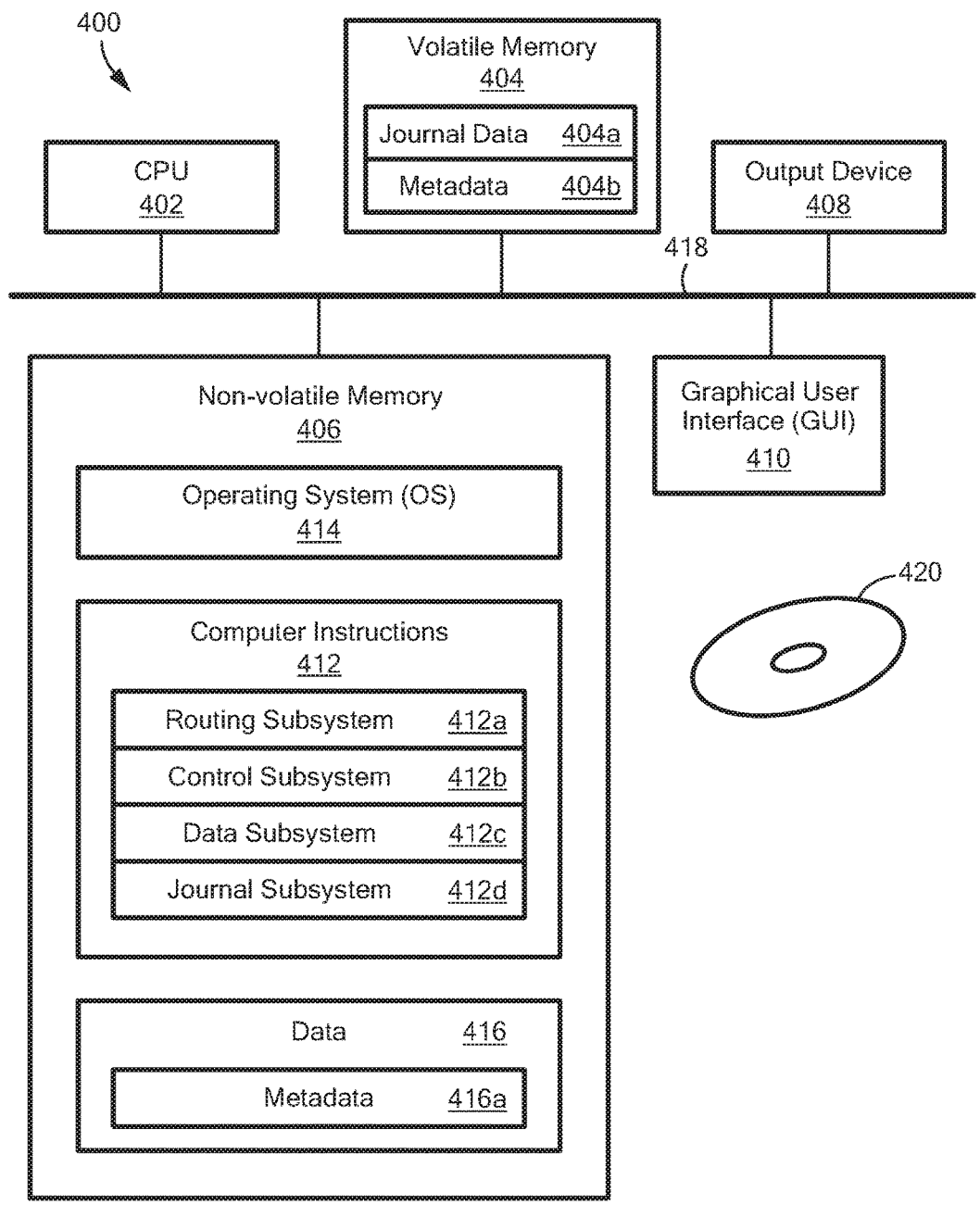
FIG. 4 is a schematic representation of an illustrative computer in accordance with an embodiment of the disclosure.

FIG. 4 shows an illustrative computer (e.g., physical or virtual) or other processing device 400 that can perform at least part of the processing described herein. In some embodiments, the computer 400 forms a part of a storage system, such as storage system 100 of FIG. 1. The computer 400 may include a processor 402, a volatile memory 404, a non-volatile memory 406 (e.g., hard disk or SSD), an output device 408 and a graphical user interface (GUI) 410 (e.g., a mouse, a keyboard, a display, for example), each of which is coupled together by a bus 418. The non-volatile memory 406 is configured to store computer instructions 412, an operating system 414, and data 416. In one embodiment, the computer instructions 412 are executed by the processor 402 out of volatile memory 404. In some embodiments, an article 420 comprises non-transitory computer-readable instructions.

In the embodiment shown, computer instructions 412 include router instructions 412a that may correspond to an implementation of a router 102a (FIG. 1), control subsystem instructions 412b that may correspond to an implementation of a control subsystem 102b, data subsystem instructions 412c that may correspond to an implementation of a data subsystem 102c, and journal subsystem instructions 412d that may correspond to an implementation of a journal subsystem 102d. As shown, in some embodiments, non-volatile memory 406 may be configured to store metadata (e.g., information used within the A2H table 112 and/or the H2P table 114).

The volatile memory 404 may be configured to store journal data 404a and metadata 404b. In some embodiments, the amount of memory allocated for the journal data 404a and/or the metadata 404b is determined processing illustrated in FIGS. 2A, 2B, and 3 and described above in conjunction therewith.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:
1. A method comprising:
 calculating a relationship of a first number of read operations and a second number of write operations of a plurality of I/O operations made to a storage system having a volatile memory;

selecting a memory allocation scheme based upon the relationship of the first number of read operations and the second number of write operations; and applying the memory allocation scheme, wherein applying the memory allocation scheme comprises allocating capacity of the volatile memory based upon the selected allocation scheme, wherein calculating the relationship of the first number of read operations and the second number of write operations comprises calculating a moving average of the relationship of the first number of read operations and the second number of write operations.

2. The method of claim 1 wherein selecting a memory allocation scheme is further based upon moving averages of read I/O latency and write I/O latency.

3. The method of claim 1 further comprising, according to the selected memory allocation scheme:

allocating a first amount of volatile memory as a metadata cache; and allocating a second amount of volatile memory as a journal.

4. The method of claim 3 further comprising:

mapping logical block addresses (LBA) of the storage system to chunk hashes; and mapping the chunk hashes to physical storage locations on storage devices of the storage system.

5. The method of claim 1 further comprising de-allocating capacity of the volatile memory based upon the selected allocation scheme.

6. The method of claim 1 wherein applying the memory allocation scheme further comprises determining if the memory allocation scheme should be applied.

7. The method of claim 6 further comprising:

using hysteresis to determine if the memory allocation scheme should be applied.

8. The method of claim 1 wherein calculating the relationship of the first number of read operations and the second number of write operations comprises calculating a ratio of the first number of read operations and the second number of write operations, the method further comprising:

selecting a first memory allocation scheme if the ratio exceeds a first threshold;

selecting a second memory allocation scheme if the ratio exceeds a second threshold; and selecting a third memory allocation scheme if the ratio exceeds neither the first threshold nor the second threshold.

9. A system comprising:

a processor;

a volatile memory; and a non-volatile memory storing computer program code that when executed on the processor causes the processor to execute a process operable to perform the operations of:

calculating a relationship between a first number of read operations and a second number of write operations of a plurality of I/O operations to a storage system having a volatile memory;

selecting a memory allocation scheme based on the relationship of the first number of read operations and the second number of write operations; and applying the selected memory allocation scheme, wherein applying the selected memory allocation scheme comprises allocating capacity of the volatile memory based upon the selected memory allocation scheme, wherein calculating the relationship of the first number of read operations and the second number of write operations comprises calculating a moving average of the relationship of the first number of read operations and the second number of write operations.

10. The system of claim 9 wherein the computer program code causes the processor to execute a process operable to select the memory allocation scheme further based upon a moving averages of read latency and write latency.

11. The system of claim 9 wherein the computer program code causes the processor to execute a process operable to:

allocate a first amount of volatile memory as a metadata cache according to the selected memory allocation scheme; and allocate a second amount of volatile memory as a journal according to the selected memory allocation scheme.

12. The system of claim 11 wherein the metadata includes a logical block address (LBA) to chunk hash mapping and a chunk hash to storage location mapping.

13. The system of claim 9 wherein the computer program code causes the processor to execute a process further operable to de-allocate capacity of the volatile memory based upon the selected allocation scheme.

14. The system of claim 9 wherein the computer program code causes the processor to execute a process further operable to determine if the memory allocation scheme should be applied.

15. The system of claim 14 wherein the computer program code causes the processor to execute a process further operable to:

use hysteresis to determine if the memory allocation scheme should be applied.

16. The system of claim 9 wherein the computer program code causes the processor to execute a process operable to calculate the relationship of the first number of read operations and the second number of write operations by calculating a ratio of the first number of read operations and the second number of write operations, the method further comprising and further operable to:

select a first memory allocation scheme if the ratio exceeds a first threshold;

select a second memory allocation scheme if the ratio exceeds a second threshold; and select a third memory allocation scheme if the ratio exceeds neither the first threshold nor the second threshold.

17. A computer program product tangibly embodied in a non-transitory computer-readable medium, the computer-readable medium storing program instructions that are executable to:

calculate a relationship of a first number of read operations and a second number of write operations of a plurality of I/O operations made to a storage system having a volatile memory;

select a memory allocation scheme based upon the relationship of the first number of read operations and the second number of write operations; and applying the selected memory allocation scheme, wherein applying the memory allocation scheme comprises allocating capacity of the volatile memory based upon selected allocation scheme, wherein calculating the relationship of the first number of read operations and the second number of write operations comprises calculating a moving average of the relationship of the first number of read operations and the second number of write operations.

* * * * *